United States Patent [19]
Parkell

[11] 4,453,964
[45] Jun. 12, 1984

[54] AIR DISTRIBUTING MECHANISM FOR GLASS FORMING APPARATUS

[75] Inventor: Edward Parkell, Millville, N.J.

[73] Assignee: Maul Technology Corporation, Millville, N.J.

[21] Appl. No.: 397,632

[22] Filed: Jul. 12, 1982

[51] Int. Cl.³ .............................................. C03B 9/36
[52] U.S. Cl. ...................................... 65/261; 65/234; 65/300
[58] Field of Search .................. 65/300, 234, 233, 261

[56] References Cited

U.S. PATENT DOCUMENTS

| | | | |
|---|---|---|---|
| 1,285,420 | 11/1918 | Scull | 65/300 |
| 3,586,494 | 6/1971 | Mumford | 65/234 X |
| 3,871,856 | 3/1975 | Trahan | 65/261 |

OTHER PUBLICATIONS

Copy of Maul Bros. Inc. drawing 600-706-520.

Primary Examiner—Arthur D. Kellogg
Attorney, Agent, or Firm—Seidel, Gonda & Goldhammer

[57] ABSTRACT

An arm which may support a baffle or blowhead is adapted at one end for clamping to a vertical shaft. First and second holder units are supported by the arm between its ends. Each unit has a holder open at its bottom and into which a baffle or blowhead may be inserted from below. A spring biased latch is provided for each unit and adapted to prevent relative rotation between the holder and its associated baffle or blowhead. A manifold in the arm communicates with each unit by exposed conduits.

8 Claims, 5 Drawing Figures

AIR DISTRIBUTING MECHANISM FOR GLASS FORMING APPARATUS

BACKGROUND

A typical I.S. glass forming machine has a baffle arm and a blowhead arm. The baffle arm removably supports a baffle which is utilized to direct settle-blow air to a parison to cause the parison to settle against the neck pin and neck ring to form the threads on narrow neck glassware. The blowhead arm supports a blowhead for distributing air for forming the final shape of the container. A wide variety of baffles and blowheads are used by those skilled in the art.

When two or more units are supported by the baffle arm, there is always presented the problem of timing whereby each unit must make sealing contact with the mold at the same time. That problem is solved by the present invention in a manner whereby one unit will always make contact before the other and is vertically movable to be certain that both units are in a sealed position. The arm components disclosed herein may be used as a baffle arm or a blowhead arm thereby minimizing the number of different components which must be manufactured and/or stored in inventory. In the present invention, the latch pins for latching the holder to its associated baffle or blowhead have been relocated so that they cannot be inadvertently damaged as was the case heretofore.

SUMMARY OF THE INVENTION

The present invention is directed to an air distributing mechanism for a glass forming apparatus. The invention includes an arm having means at one end thereof means for attachment to a vertical shaft. A first unit is supported by the other end of the arm. A second unit is supported by the arm between its ends. Each unit includes a holder open at its bottom and into which an air distributing member may be inserted from below. A first latch is spring biased downwardly on the arm at a location adjacent the first holder for preventing relative rotation between the first holder and an associated air distribution member. A second latch is spring biased downwardly on the arm adjacent the second holder for preventing relative rotation between the second holder and an air distributing member to be associated therewith. A manifold in the arm communicated with each holder by exposed conduits.

It is an object of the present invention to provide an air distributing mechanism which lacks internal porting to eliminate leakage.

It is another object of the present invention to provide an air distributing mechanism wherein latch pins are mounted in a location so that they cannot inadvertently damaged.

It is another object of the present invention to provide an air distributing mechanism having plural holders at different elevations so that an air distributing member associated with the first holder will make initial contact with its associated blank mold.

Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
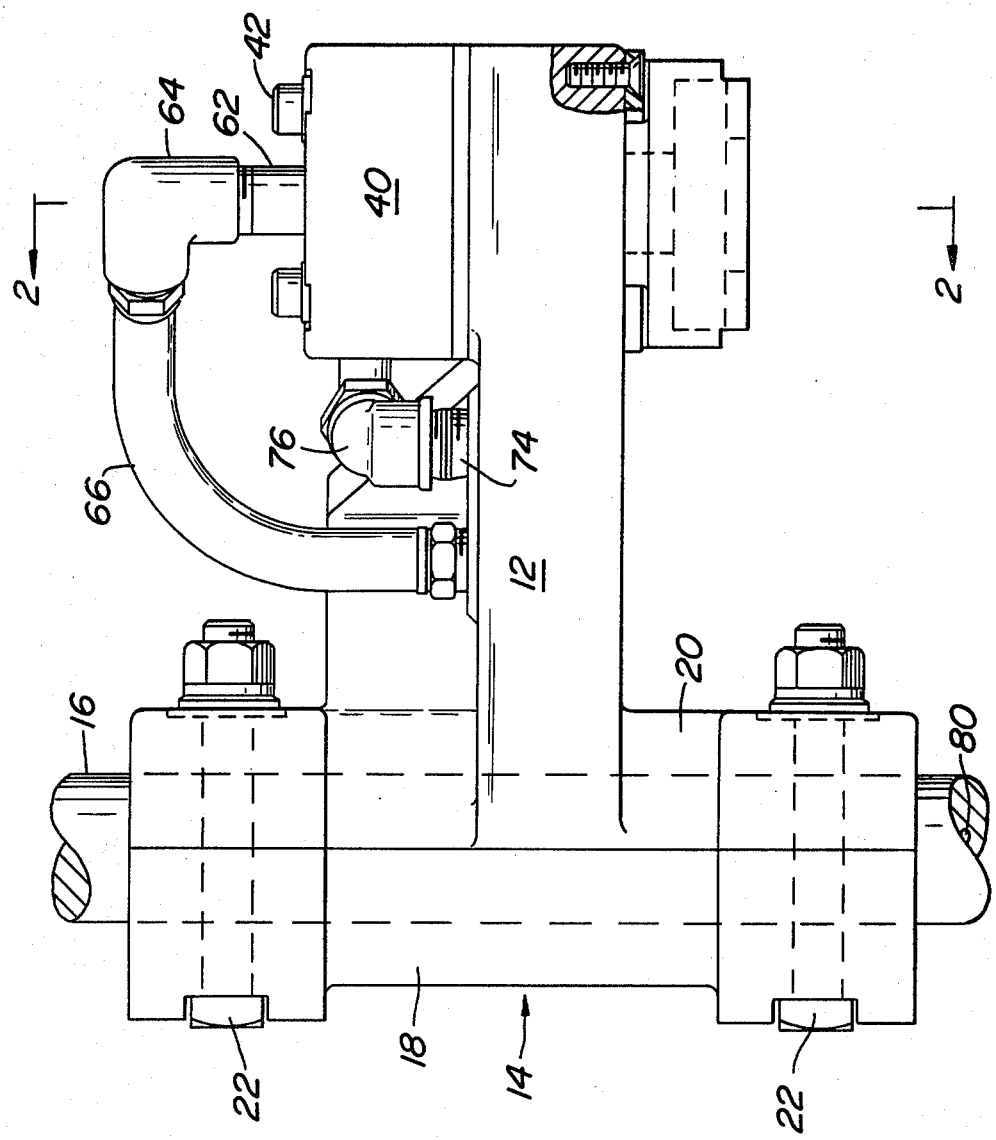
FIG. 1 is an elevation view of the air distributing mechanism of the present invention.

Referring to the drawings in detail, wherein like numerals indicate like elements, there is shown an air distributing mechanism in accordance with the present invention designated generally as 10. The mechanism 10 includes an arm 12 adapted to be horizontally disposed for use as a baffle arm or blowhead arm in an I.S. glass forming machine. For purposes of illustration arm 12 will be a baffle arm. A clamp means 14 is provided at one end of the arm 12 for clamping the arm to a vertically disposed shaft 16.

The clamp means 14 includes a cap 18 having a semicircular recess on one face for contact with the shaft 16. Clamp means 14 includes a clamping member 20 which is integral in one piece with one end of the arm 12. Clamping member 20 also has a semi-circular recess for embracing part of the periphery of shaft 16. The cap 18 and member 20 are retained in position on shaft 16 by a plurality of bolts 22 extending through elements 18 and 20. The bolts 22 are adjusted to be sufficiently tight so that the arm 12 will rotate with the shaft 16 as the shaft 16 rotates about its longitudinal axis.

As disclosed herein, the arm 12 has first and second units 24 and 26 supported thereby for use in making glassware in a double gob arrangement. The mechanism of the present invention is adaptable for triple or quadruple gob systems. Unit 24 is supported adjacent the end of arm 12 remote from the shaft 16. Unit 26 is closer to shaft 16 than unit 24. The axes of units 24 and 26 and the shaft 16 form a triangle.

Figure 2:
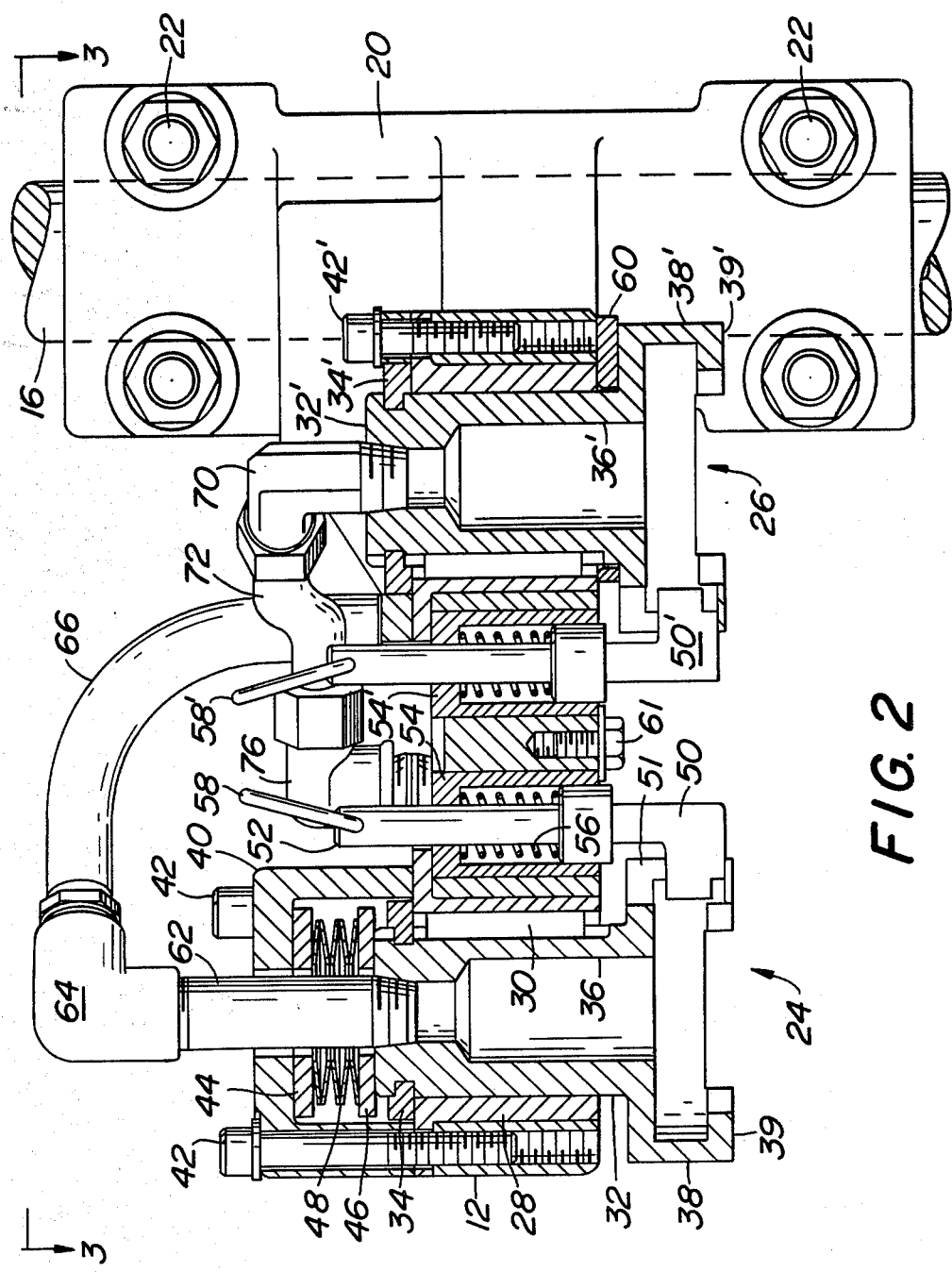
FIG. 2 is a sectional view taken along the line 2—2 in FIG. 1.

Referring particularly to FIG. 2, the unit 24 includes a bushing 28 mounted in a bore on arm 12. Bushing 28 has a radially outwardly extending flange which overlies the top surface of the arm 12. Bushing 28 is connected to the arm 12 by way of a key 30 which prevents relative rotation. A holder 32 is reciprocably supported within the bushing 28. Holder 32 has split rings removably attached to its upper end. The split rings are designated 34 and overlie the upper surface of the bushing 28. The lower end of holder 34 is provided with an enlarged diameter portion 38 which is open at its bottom end and provided with a bayonet slot to facilitate attachment of an air distributing member such as a baffle or blowhead. The lowermost surface of holder 32 is designated 39. Holder 32 is hollow with the bore being designated 36.

A cap 40 is bolted to the upper surface of arm 12 by bolts 42. Within the cap 40 and above the elevation of the holder 32, there is provided spring washers 48 between thrust washers 44, 46. Thus, the holder 32 may reciprocate vertically for a short distance and is shown in its lowermost position in FIG. 2.

Vertical reciprocation of holder 32 is guided by a latch 50 disposed in a axial slot 51 on the portion 38. Latch 50 is adapted to cooperate with a peripheral slot on the baffle or blowhead to prevent relative rotation with respect to the holder 32. Latch 50 is connected to a shaft 52 extending through a bushing 54. A spring 56 extends between one end of the bushing 54 and an enlarged diameter portion on the shaft 52. Shaft 52 projects to an elevation above the upper surface of the arm 12 and terminates in a pull ring 58. It will be noted that the latch 50 is disposed between the units 24 and 26. See FIG. 3. Thus, latch 50 is located in a completely protected area whereby it cannot be inadvertently damaged by contact with some other structure during movement of the arm 12. A peripheral portion of ring 34 overlies the upper surface of bushing 54.

Figure 3:
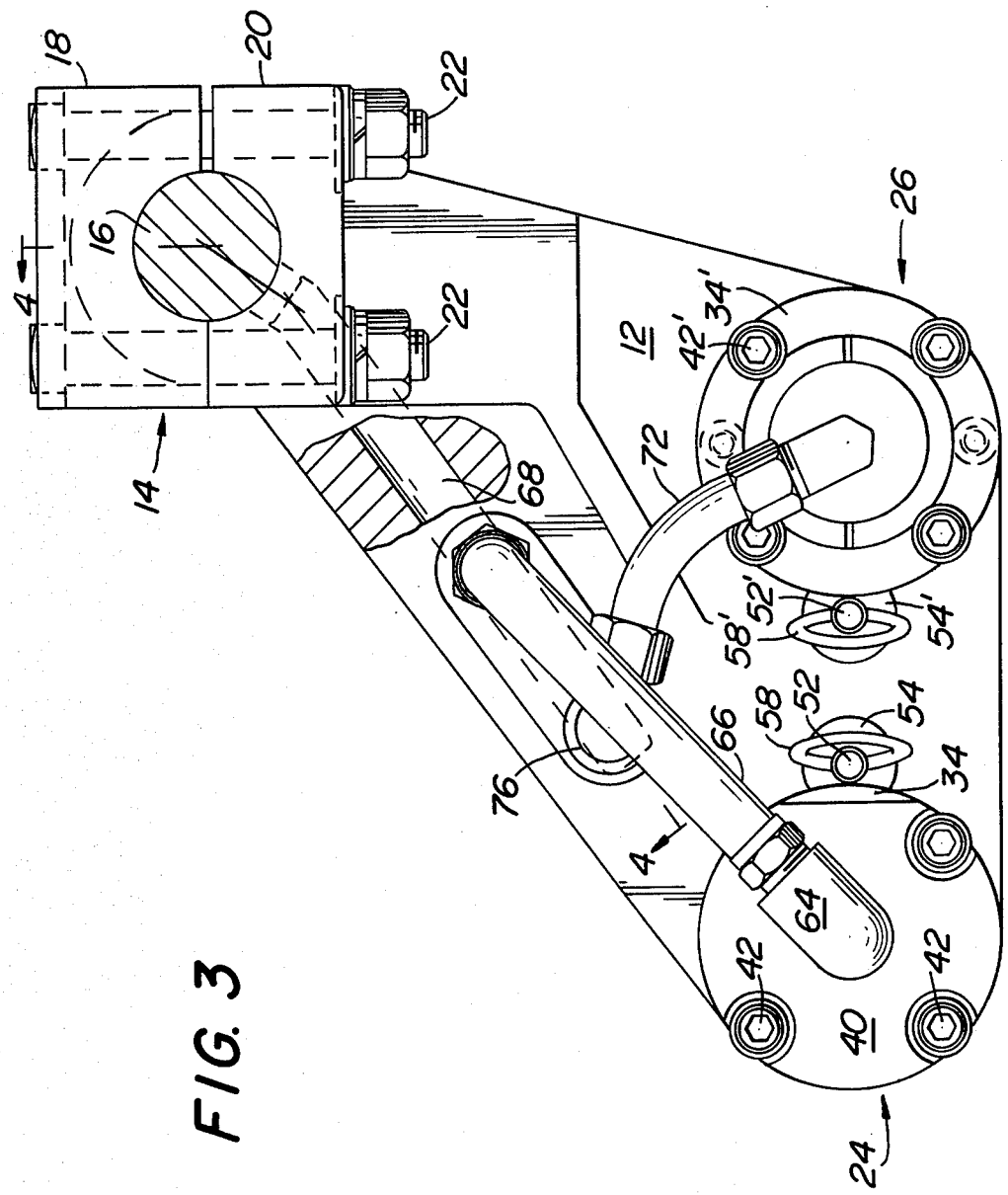
FIG. 3 is a sectional view taken along the line 3—3 in FIG. 2.

The unit 26 is substantially the same as unit 24 except as will be made clear hereinafter. Hence, corresponding elements are provided with corresponding primed numerals. The holder 32' is fixed in position with its ring 34' overlying the upper surface of arm 12. A spacer 60 is provided between the bottom surface of arm 12 and the enlarged diameter portion 38'. The elevation of bottom surface 39' is slightly above the elevation of surface 39. The bushings 54, 54' are supported from below by a washer and bolt 61. The latches 50, 50' extend away from each other as shown more clearly in FIG. 2. As shown in FIG. 3 the axes of shafts 52, 52' are aligned with the axes of units 24, 26.

As shown in the drawings, conduits for supplying air are preferably exposed and connected to the upper end of the holders 32, 32'. Internal porting is eliminated. A short pipe 62 has its lower end threadedly connected to the upper end of holder 32. Pipe 62 extends through a hole in the cap 40 and is threadedly connected to an elbow 64. Elbow 64 is connected to one end of a flexible conduit 66. The other end of conduit 66 is threadedly connected to a nipple on the arm 12 for communication with a manifold 68.

An elbow 70 is threadedly connected to the upper end of holder 32'. Elbow 70 is connected to one end of a rigid stationary conduit 72. The other end of conduit 72 is connected to an elbow 76 on nipple 74. See FIG. 1. By using exposed conduits 66, 72, internal machining is minimized. Vertical reciprocation of holder 32 is accommodated by the flexibility of conduit 66.

Figure 4:
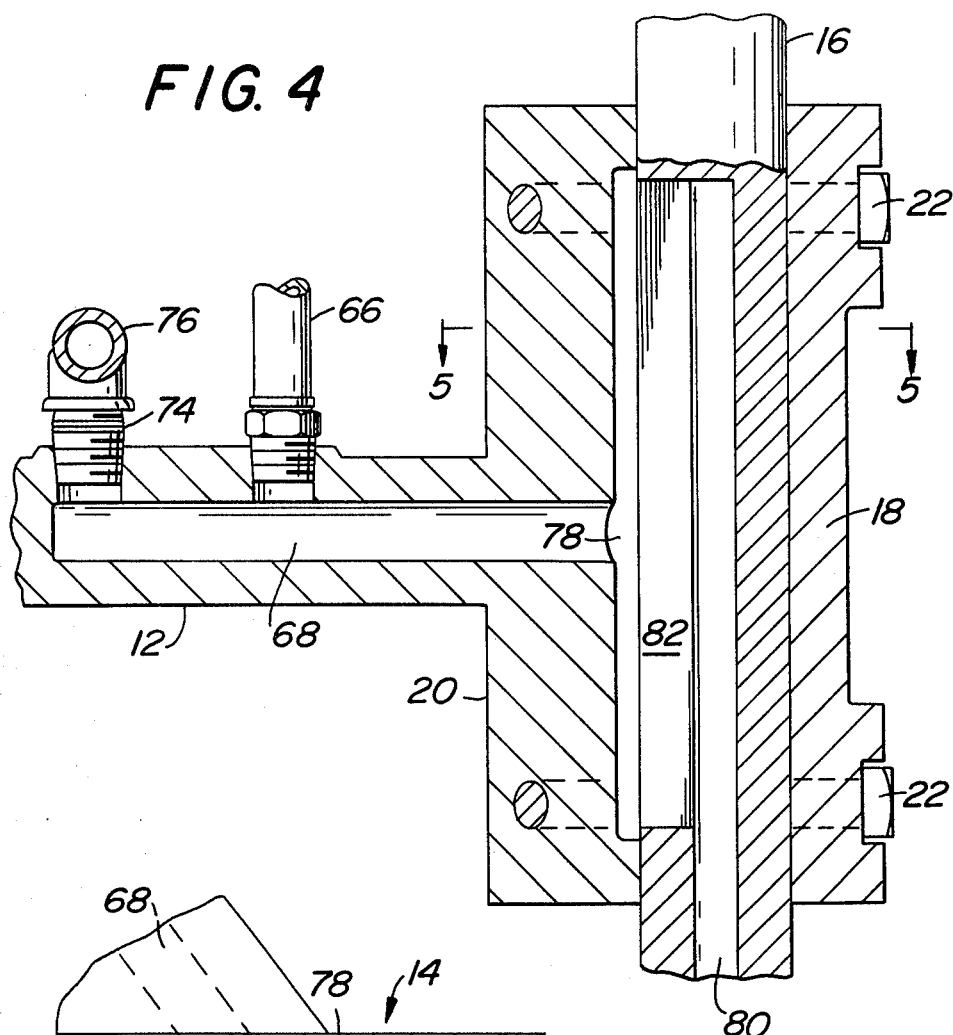
FIG. 4 is a sectional view taken along the line 4—4 in FIG. 3.
Figure 5:
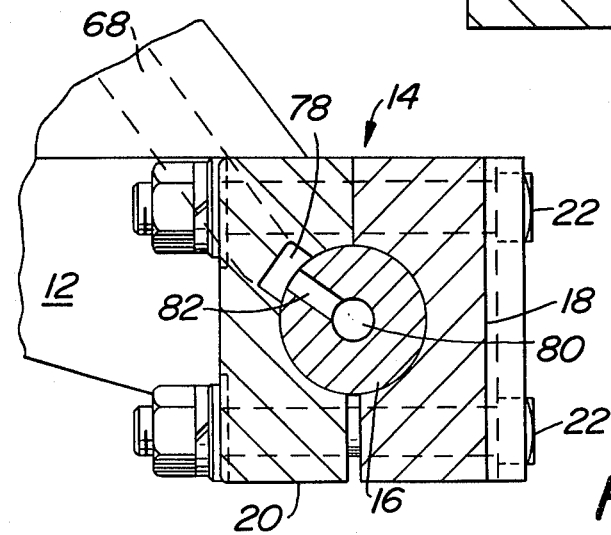
FIG. 5 is a sectional view taken along the line 5—5 in FIG. 4.

Air may be supplied to the manifold 68 in any convenient manner. In the preferred embodiment, air is supplied by way of bore 80 in the shaft 16. Manifold 68 communicates with a vertically disposed recess 78 on the inner periphery of clamping member 20. See FIGS. 4 and 5. Bore 80 communicates with recess 78 by way of radially disposed slot 82.

The arm 12 is clamped to the shaft 16. Rotation of the shaft 16 moves the arm 12 between operative and inoperative positions. An air distributing member such as a baffle or blowhead is readily attached to the holders 32, 32' as follows.

Ring 58 is pulled upwardly a sufficient distance so that latch 50 is moved upwardly to an inoperative position. Thereafter, an air distributing member is inserted into the lower end of holder 32 and then rotated 90° to make a bayonet type connection facilitated by the enlarged diameter portion 38. This will align a peripheral slot on the air distributing member with slot 51. Thereafter, ring 58 may be let go. Spring 56 will expand and move the latch 50 downwardly to the position shown in FIG. 2 wherein it will prevent relative rotation between the air distributing member and the holder 32.

An air distributing member is connected in a like manner to the holder 32'. As the shaft 16 descends during operation of the I.S. machine, the arm 12 will descend. The air distributing member supported by holder 32 will make contact with a mold. As arm 12 continues to descend, holder 32 will reciprocate vertically for a short distance until the air distributing member supported by holder 32' makes contact with its mold. Thereafter, air may be distributed via the manifold 68 and the exposed conduits to the upper end of the holders 32, 32' and the associated distributing members adapted to be supported thereby. The difference in elevation between the surfaces 39 and 39' may be small such as 1.5 to 2 millimeters.

If desired, unit 26 could be identical with unit 24 with arm 12 used as a baffle arm. When arm 12 is a blowhead arm, the unit 26 is preferably identical with unit 24 and at the same elevation.

In view of the above description it will be noted that the present invention achieves the following objectives:
 (a) the key keeps its holder from turning;
 (b) there is no internal porting;
 (c) each latch is readily accessible and completely protected.

The present invention may be embodied in other specific forms without departing from the spirit or essential attributes thereof and, accordingly, reference should be made to the appended claims, rather than to the foregoing specification, as indicating the scope of the invention.

I claim:

1. A mechanism for transmitting air to a parison in a I.S. glass forming machine comprising an arm having means at one end for attachment to a vertical shaft, a first unit supported by the other end of said arm, at least one additional unit supported by said arm between its ends, each unit having a holder open at its bottom end and into which an air distributing member may be removably inserted from below, a first latch which is spring biased downwardly on said arm, said latch being located adjacent said first holder for preventing relative rotation between said first holder and an air distributing member to be supported thereby, a second latch on said arm, said second latch being spring biased downwardly and being adjacent said second holder for preventing relative rotation between said second holder and an air distributing member to be supported thereby, said arm including a manifold, said manifold communicating with a port in the upper end of each holder by exposed flexible conduits, said first holder being connected to its associated exposed conduit by a rigid hollow member, said rigid member being connected to said first holder in an airtight manner and communicating with said port of the first holder such that said first holder and its associated conduit are movable axially together as a unit.

2. A mechanism in accordance with claim 1 wherein the exposed conduit associated with said first holder is flexible at least in part.

3. A mechanism in accordance with claim 2 wherein said first holder is reciprocably supported by said arm and spring biased downwardly.

4. A mechanism in accordance with claim 1 wherein each latch is connected to the lower end of a vertically disposed shaft having a pull ring at the upper end which is above the elevation of the arm.

5. A mechanism in accordance with claim 4 wherein said latches are between said units, the axes of said latch shafts being aligned with the axes of said holders.

6. A mechanism in accordance with claim 1 wherein said first holder is vertically reciprocably supported by said arm, said second holder being immovably supported by said arm, the lowermost surface of said first holder being below the elevation of a corresponding surface on said second holder.

7. A mechanism for transmitting air to a parison in a glass forming machine comprising an arm having means on one end for releasably securing the arm to a vertically disposed support with the arm being horizontally disposed, first and second hollow holders on said arm for delivering air during a glass forming process, said holders being open on the lower end for releasably receiving an air distributing member, a manifold in said arm and communicating with the upper end of said holders, exposed conduits communicating said manifold with the upper end of said holders, the conduit associated with first holder being flexible at least in part, said first holder being vertically reciprocal and spring biased downwardly to a position wherein a lowermost surface on said first holder is below the elevation of a corresponding surface on said second holder an airport in the upper end of said first holder, said first holder being connected to its associated exposed conduit by a rigid hollow member, said rigid member being connected to the upper end of the first holder in an airtight manner such that said first holder and its associated conduit are movable axially together as a unit.

8. A mechanism in accordance with claim 7 including first and second latches supported by said arm between said holders, each latch being vertically reciprocal and spring biased downwardly, each latch having a tongue extending away from each other and toward its associated holder for preventing relative rotation between its associated holder and an air distributing member to be supported thereby.

* * * * *